Oct. 27, 1970   O. B. CECIL ET AL   3,536,522
METHOD FOR PURIFICATION OF REACTION GASES
Filed May 21, 1968
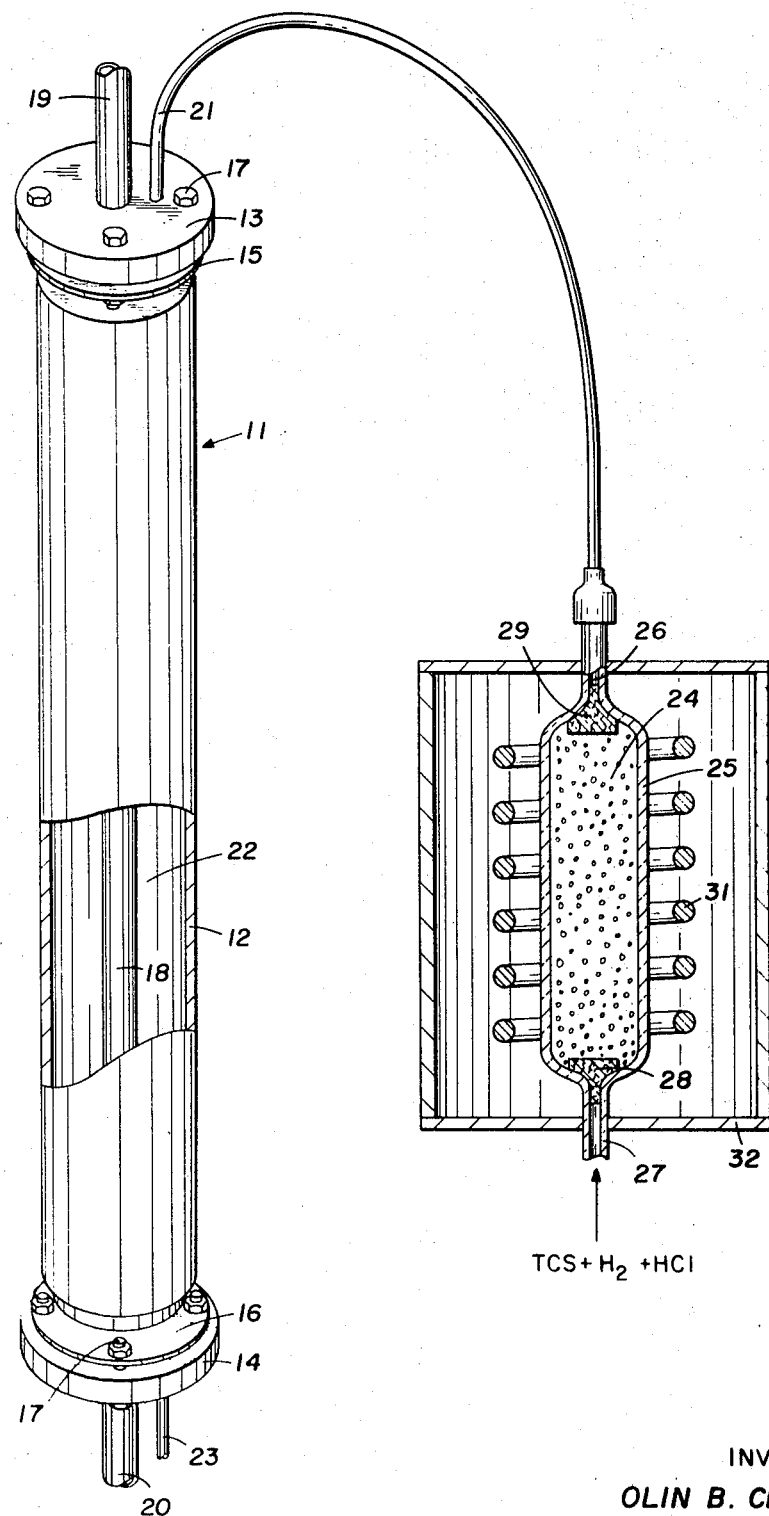
TCS+ H$_2$ +HCl
INVENTORS:
OLIN B. CECIL
LAWRENCE D. DYER
V. Bryan Medlock, Jr.
ATTORNEY United States Patent Office 3,536,522
Patented Oct. 27, 1970

3,536,522
METHOD FOR PURIFICATION OF REACTION GASES
Olin B. Cecil, Dallas, and Lawrence Dean Dyer, Richardson, Tex., assignors to Texas Instruments Incorporated, Dallas, Tex., a corporation of Delaware
Filed May 21, 1968, Ser. No. 730,822
Int. Cl. C23c 11/06
U.S. Cl. 117—106                                    9 Claims

ABSTRACT OF THE DISCLOSURE

In the method of depositing a material, such as silicon, from a gaseous stream onto a substrate, which may also be silicon, an improvement which permits removal of contaminants in the gaseous stream which would react with the substrate by contacting the gaseous stream with the surface of a material which is also reactive with the contaminants to thereby deplete the contaminants from the gaseous stream before the stream contacts the substrate.

---

This invention relates to the depositing of material from a gaseous stream onto a substrate, and more particularly, but not by way of limitation, to a method for purifying the gaseous stream to remove unwanted contaminants therefrom.

Deposition of material from a gaseous stream onto a substrate is a process used by manufacturers of semiconductor components. For example, the vapor deposition of silicon on silicon substrates is a process well known in the semiconductor industry for obtaining high purity elementary silicon. While in many instances, the silicon deposited upon the substrate is polycrystalline in nature, several production steps can be eliminated if the silicon body formed by the deposition is substantially single crystal material. More particularly, if a polycrystalline body is formed by the deposition of silicon onto a silicon substrate, the resulting body must be zone melted or grown from the melt to transform the polycrystalline body into a single crystal material. Zone melting and growing from a melt both add to the expense of the final material. If, however, single crystal material can be formed as the silicon is deposited from a vapor stream onto a single crystal substrate, the resulting material may be sliced, polished and further treated to produce diodes, transistors and the like without the necessity of zone melting.

In efforts to obtain a single crystal material by deposition of silicon from a gaseous stream onto a single crystal substrate, impurities in the stream of the gaseous reactants will react with the surface of the single crystal substrate producing compounds which distort the pattern of crystal growth. Any oxygen contained in the gaseous reactants, for example, will react with the silicon to form silicon dioxide. As the silicon is deposited from the vapor stream onto a disturbed crystal area, which may be caused by the formation of silicon dioxide, a polycrystalline region will develop which, of course, renders the material unsuitable for use as a silicon semiconductor material without remelting of the material.

The present invention is directed to an improvement in the method of depositing material from a gaseous stream onto a substrate by providing a method for purification of the gaseous stream from which the material is to be deposited.

The invention may be generally described as an improvement in the method of depositing material from a gaseous stream containing contaminants onto a substrate with which the contaminants can react, by contacting the gaseous stream with the surface by a material reactive with the contaminants in the gaseous stream before passing the stream over the substrate.

For specific description of an embodiment of the present invention, reference is made to the drawing, which illustrates, partially in elevation and partially in cross section, an apparatus suitable for carrying out the present invention.

With reference to the drawing, conventional reactor 11 comprises a cylindrical quartz tube 12 which is held between end plates 13 and 14 by ring clamps 15 and 16, respectively. Clamps 15 and 16 are secured in place by nut and bolt assemblies 17. Positioned within reactor 11 is a silicon filament 18, the opposite ends of which are in electrical communication with electrodes 19 and 20 which extend through end plates 13 and 14, respectively, for attachment to a conventional electric power source.

For introducing reaction gases into reactor 11, there is provided an inlet line 21 which passes through end plate 13 to discharge the gases into the chamber 22 formed by quartz tube 12, and an outlet line 23 which passes through end plate 14 to permit discharge of gases from chamber 22.

The filament 18 is an elongated single crystal silicon material which, for example, may be rod-like in shape, with its longitudinal axis oriented in the [111] direction.

Reaction gases which are known to react at elevated temperatures for deposition of silicon on the filament 18 are introduced into inlet line 21 through a particulate bed of silicon 24 supported within a cylindrical quartz vessel 25 which is reduced in diameter at either end to form nipples 26 and 27. Nipples 26 and 27 facilitate the attachment of tubing, such as line 21, to either end of vessel 25. A silicon containing gas stream, which for example, may be a mixture of trichlorosilane and hydrogen, is introduced into vessel 25 by way of nipple 27 from a conventional trichlorosilane bubbler. The bubbler conventionally comprises a container of liquid trichlorosilane through which hydrogen is bubbled to entrain trichlorosilane vapors before exiting the container and being introduced into nipple 27. Gases passing through nipple 27 will be conducted through a porous retaining plug 28, such as quartz fiber, which serves to support the particulate silicon 24 within vessel 25. Gases after passing through plug 28 will traverse the particulate bed of silicon 24 before passing through the second particulate plug 29, also of quartz fiber. The gases passing through silicon 24 will serve to fluidize the silicon 24 thus permitting maximum contact between the gases and particles of silicon 24. The gases will then exit through nipple 26 into inlet 21 which serves to discharge the gases into chamber 22 and reactor 11 where they may react to deposit silicon on filament 18.

In order to elevate the temperature of the particulate bed of silicon 24, vessel 25 is surrounded by an electrical resistance coil 31 which in turn is contained within a heat shield 32 of asbestos or the like to conserve heat being generated within coil 31.

To illustrate how the above described apparatus may be used in carrying out the present invention, reference is made to the following examples. Example I details a test run without the use of the purifying apparatus contained in the bent shield 32. Example II, by contrast, details a test run with the purifying apparatus.

EXAMPLE I

An eight-inch single crystal silicon filament approximately ¼" in diameter was suspended between electrodes 19 and 20 and centrally positioned along the longitudinal axis of an approximately 1¾" I.D. quartz tube 12. The filament was a "grown silicon filament having its longitudinal axis oriented in [111] direction. The inlet line 21 was removed from nipple 26 and attached to a source of hydrogen which was used to purge chamber 22. After purging chamber 22, the temperature of the filament was elevated to 1300° C. by passing a 60-cycle current through the filament in a conventional manner. After the filament had reached 1300° C., ten liters per minute of hydrogen were circulated through the enclosure. After the hydrogen had been circulated over the filament for a period of 11 minutes, a flow of two liters per minute of hydrogen chloride gas was introduced into the hydrogen stream prior to its entry into the reactor 11, bringing the total gas flow through the reactor 11 to 12 liters per minute. The hydrogen chloride and hydrogen mixture, which served to etch the surface of filament 18 for removing any impurities which may have associated themselves with the surface of filament 18 during handling, was circulated over the filament for one minute, after which the hydrogen chloride flow was terminated. Ten liters per minute of hydrogen continued to flow over the filament for an additional two minutes, at the end which one liter per minute of hydrogen chloride was introduced into the hydrogen stream bringing the total gas flow to 11 liters per minute to serve as a secondary etch step. The gaseous mixture containing hydrogen chloride and hydrogen in a 1:10 ratio was passed over the filament for a period of 15 minutes. At the end of the 15-minute period, an additional stream containing hydrogen and trichlorosilane was introduced into the stream of hydrogen and hydrogen chloride gas bringing the total flow rate to 20 liters per minute, 2% by volume of which was trichlorosilane and one liter per minute of which was hydrogen chloride. Then, one minute after introducing the hydrogen and trichlorosilane stream, the hydrogen chloride flow rate was reduced to 500 cc. per minute. After two minutes under these flow conditions, the temperature of the filament was reduced 50° C. to 1250° C. At the end of an additional five minute period all the hydrogen chloride flow rate was reduced to 250 cc. per minute for a two minute period following which the temperature was again reduced 50° to 1200° C. Five minutes after reducing the temperature of the filament to 1200° C., the hydrogen chloride flow rate was reduced to 125 cc. per minute which flow rate was maintained for two minutes, at the end of which the temperature of the filament was reduced to 1150° C. Five minutes after reducing the temperature of the filament to 1150° C., the hydrogen chloride flow rate was terminated and the gaseous mixture of hydrogen and trichlorosilane continued to flow through reactor 11 for a period of 60 minutes, after which all gas flow was terminated.

After the filament 18 was permitted to cool, it was found to contain 200 twin defects per inch on the [211] faces.

EXAMPLE II

The procedure of the Example I was repeated, except all gases to be circulated through reactor 11 were first introduced through vessel 25 which took the form of a 1½" I.D. quartz tube ten inches in length. The vessel 25 contained particulate "Lopex" grade silicon particles having diameters ranging from ¼" to 100 microns. The particulate bed 24 was maintained at the temperature of 800° C. by the resistance heater coil 31 throughout the etching steps and deposition steps described in Example I. After etching and deposition, the filament 18 was removed and found to contain only two thin defects per inch on the [211] faces of the filament.

From examination of Examples I and II it will be observed that contaminants such as water, oxygen or oxides of carbon which would ordinarily react with filament 18 generating defects thereon have been removed by the passage through particulate bed 24. It is believed that the water, oxygen and oxides of carbon react with the silicon in bed 24 depleting those constituents from the gas stream before the stream encounters filament 18.

While the embodiment illustrated in FIG. 1 utilizes a particulate silicon bed external to the reactor 11, such a bed could be provided within reactor 11, though temperature control could not be as easily exercised. Further, it is not necessary that the gases be admixed before being introduced into silicon bed 24 as they may be introduced separately either into the same silicon bed 24 or separate silicon beds, though the method described in Example II is preferred. Thus, a stream of hydrogen and hydrogen chloride from a first source can be mixed with a stream of hydrogen and trichlorosilane before introduction into vessel 25.

The temperature of particulate bed 24 may be maintained at any temperature from about 300° C. to 1000° C., though less of the contaminants will be removed at 300° C. than is preferred, and some reaction of the trichlorosilane and hydrogen can occur at temperatures above 1000° C. depleting the reactants introduced into reactor 11 of some of the silicon which could be more gainfully utilized within the reactor. Thus, while temperatures between about 300° C. and 1000° C. may be employed, temperatures around the 800° C. range are preferred.

Fixed or stationary beds of silicon or the like may also be used in lieu of fluidized beds, if desired.

It will also be appreciated that the invention is also applicable to the growth of other elements useful as semiconductor material, such as germanium, for example. As in growth of silicon filaments, with which a bed of silicon is utilized, a bed of germanium would be the preferred material for use in purifying of the reaction gases. The use of the same material for purification of the gases as is being formed by the deposition is preferred since the material will selectively remove the very impurities which would later react with, be adsorbed or be absorbed by the filament or substrate.

While trichlorosilane has been utilized in Example II as the source of silicon, it is well known that other silanes, such as dichlorosilane, tribromosilane, dibromosilane, diflorosilane, triiodosilane and the like may be employed in vapor deposition reactions, though for economic reasns, trichlorosilane is usually preferred.

While rather specific terms have been used in describing one embodiment of the invention, they are not intended, nor should they be construed as a limitation upon the invention as defined by the following claims.

What is claimed is:

1. In a method of depositing silicon, at an elevated temperature, from a gaseous stream of a silicon containing compound onto a silicon substrate, the improvement, which comprises the step of:
    passing the gaseous stream having the silicon containing compound therein through a particulate bed of silicon which is maintained at a temperature greater than about 300° C. before bringing said gaseous stream into contact with the silicon substrate.

2. The method of claim 1 wherein the temperature of the particulate bed of silicon is maintained between about 300° and 1000° C.

3. The method of claim 1, wherein the temperature of the particulate bed of silicon is maintained at about 800° C.

4. The method of claim 1, wherein the silicon containing compound in said gaseous stream is a halosilane.

5. The method of claim 4, wherein in addition to the gaseous halosilane stream passing through the particulate bed, there is also passed therethrough a stream of hydrogen.

6. The method of claim 5, wherein said hydrogen and halosilane streams are admixed before introduction into the particulate bed of silicon.

7. The method of claim 1, wherein said silicon containing compound is trichlorosilane and a stream of hydrogen is also passed through the particulate bed of silicon.

8. The method of claim 1, wherein said silicon containing compound is trichlorosilane and said trichlorosilane is admixed with hydrogen before being passed through the particulate bed of silicon.

9. The method of claim 8, wherein the temperature of said bed of particulate silicon is maintained at about 800° C.

References Cited

UNITED STATES PATENTS

| | | | |
|---|---|---|---|
| 1,577,534 | 3/1926 | Miller | 23—2 |
| 3,151,006 | 9/1964 | Grabmaier et al. | 117—106 |
| 3,409,481 | 11/1968 | Merkel et al. | 117—106 |

ALFRED L. LEAVITT, Primary Examiner

W. E. BALL, Assistant Examiner

U.S. Cl. X.R.

23—2